June 29, 1971  D. E. LUSTIG  3,589,915
PRECOOKED PORK SAUSAGE
Filed March 12, 1969  3 Sheets-Sheet 1

INVENTOR
DAVID E. LUSTIG
BY
ATTORNEY

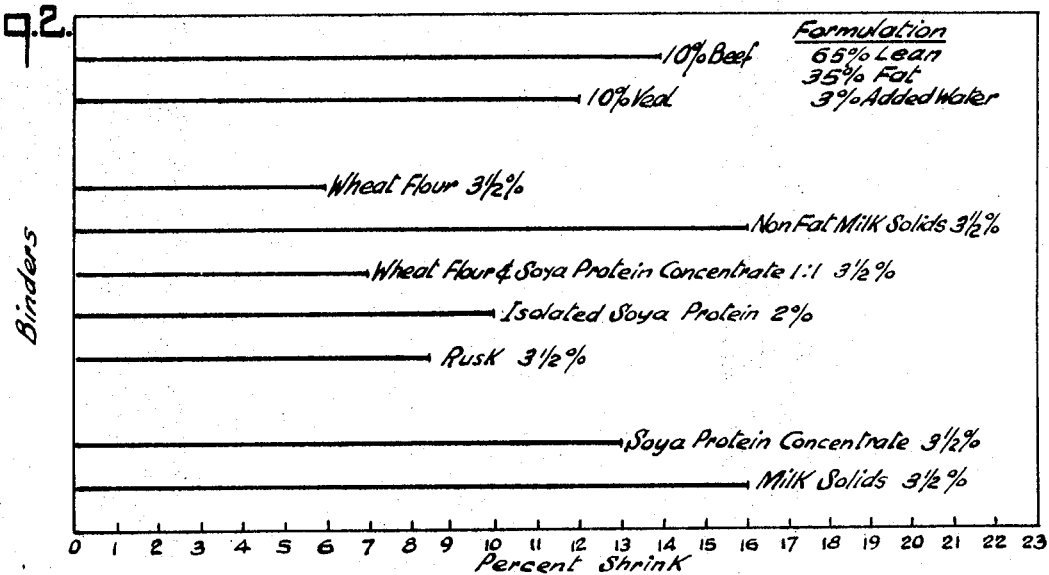
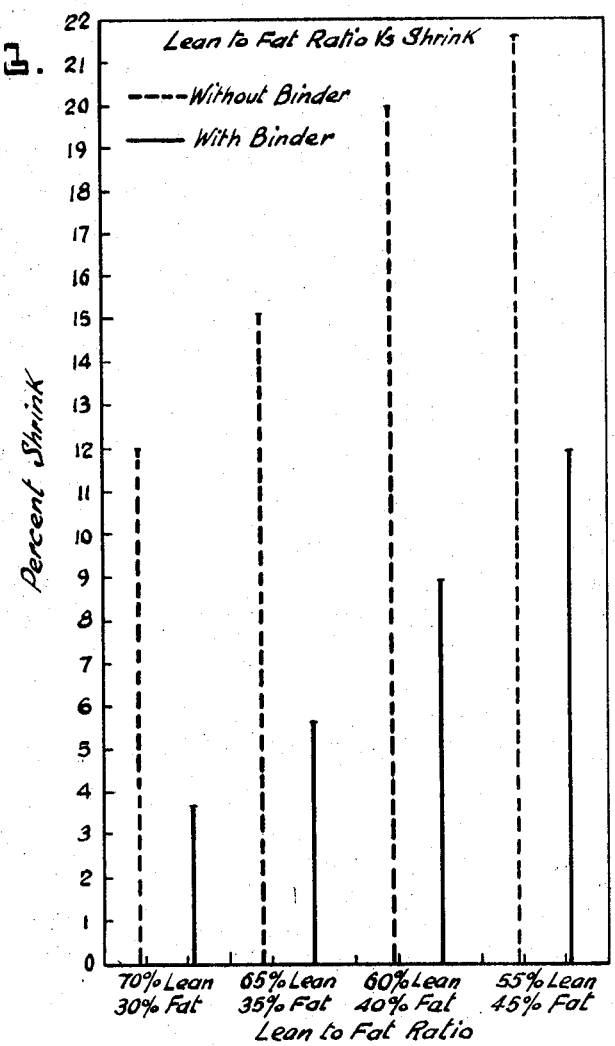

June 29, 1971  D. E. LUSTIG  3,589,915
PRECOOKED PORK SAUSAGE
Filed March 12, 1969  3 Sheets-Sheet 3

INVENTOR
DAVID E. LUSTIG
BY Robert W. Kell
ATTORNEY

United States Patent Office 3,589,915
Patented June 29, 1971

3,589,915
PRECOOKED PORK SAUSAGE
David E. Lustig, New Hope, Pa., assignor to
Devro, Inc., Somerville, N.J.
Filed Mar. 12, 1969, Ser. No. 806,485
Int. Cl. A23b 1/04
U.S. Cl. 99—109    8 Claims

ABSTRACT OF THE DISCLOSURE

A precooked pork sausage characterized by an extruded collagen casing is provided which may be recooked for serving in three to five minutes (from the thawed state) and in eight to ten minutes (from the frozen state).

---

The present invention relates to a precooked pork sausage contained within an extruded collagen casing which can be prepared quickly and conveniently for the breakfast meal.

The sausage industry has for some time made available to the housewife and to the hotel and restaurant business precooked sausage which may be served hot after reheating with a minimum cooking time. Such commercially-available products are generally made in one of two ways. The pork sausage may be precooked in a cellulose casing which is removed after the cooking step or if infra-red cooking equipment is available, the sausage may be extruded skinless. It is a disadvantage of the precooked breakfast sausages that were available prior to the present invention, however, that they did not taste like a fresh link pork sausage. This was due to the absence of the casing (skin) and to the meat emulsion that had to be specially formulated to the requirements of a "skinless" sausage. Thus, the precooked "skinless" breakfast sausage resembled in taste and texture a "skinless" frankfurther. The fresh pork sausage that had been stuffed into a casing and linked, if precooked, gave excessive shrinkage and poor appearance.

In accordance with the present invention, a pork sausage emulsion containing from 2% to 3½% by weight of a binder to be described hereinafter and from 5% to 10% by weight of water may be stuffed into an extruded collagen casing, linked and precooked. The shrinkage during the precooking step may amount to 5% to 10%, as opposed to the 18% to 22% shrinkage that generally occurs if a fresh pork sausage is precooked under similar conditions.

It is an advantage of the precooked pork sausage of the present invention that it may be recooked in three to five minutes from the thawed state while retaining the taste, flavor and texture of a fresh pork sausage.

The invention will be better understood from the following detailed description, which shows by way of example, a preferred embodiment of the inventive idea. In the sausage formulations that will be described, all quantities are expressed in parts by weight.

Referring now to the drawings:

FIG. 2 is a graph that illustrates the effect of various binders on the shrinkage of a pork sausage during the precooking step.

FIG. 3 is a graph that illustrates the effect of the ratio of lean to fat meat on the shrinkage that occurs during precooking.

The sausage formulation of the present invention requires the addition of from 2% to 3½% of an edible binder to any conventional fresh pork sausage formula. Spice levels may be increased slightly if it is determined that flavor is lost during precooking. The addition of extra dextrose or liquid corn sugar to the spice formula is helpful in browning up the sausage rapidly on recooking. The binder must be added to the sausage emulsion to control the shrink upon precooking. Pork sausage will shrink 18% to 22% upon precooking. In accordance with the present invention, the shrinkage on precooking has been reduced to as little as 5% to 10%.

As will be apparent from FIG. 2, those binders which provide satisfactory control of shrinkage on precooking are wheat flour, rusk (a cracker meal obtained by baking an unleavened high-protein wheat flour, available from Cottage Rusks Ltd., 39 West Savile Terrace, Edinburgh, 9, Scotland, U.K.) and isolated soya protein, either alone or in combination with wheat flour. Other edible binders, such as non-fat milk solids, soya protein concentrate fail to provide the necessary control of shrinkage during precooking.

The ratio of lean meat to fat in the sausage emulsion is also important in controlling the shrinkage that occurs during precooking. The leaner formulas show less shrinkage than the formulas with more fat. As will be apparent from FIG. 3 that best results are obtained with the higher ratio of lean to fat in the sausage emulsion.

Figure 4:
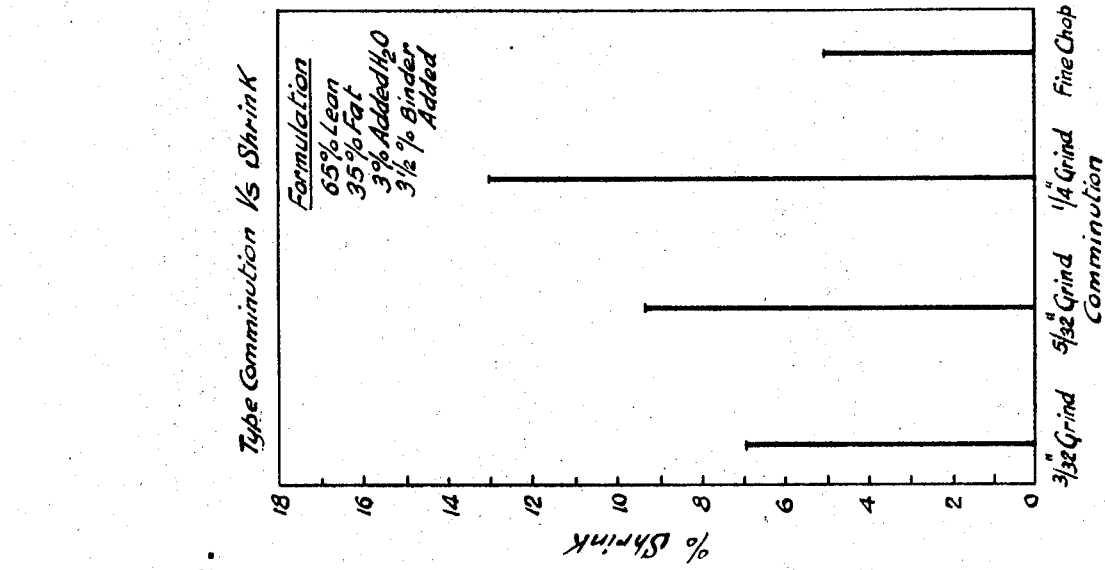
FIG. 4 is a graph that illustrates the effect that the comminution step has upon shrinkage during precooking.

The addition of water in amounts of up to 10% by weight of the lean meat present in the emulsion is permissible. Generally, 5% water, based on the total weight of the sausage emulsion will be all that is required. Occasionally, however, if the pork is dry or sticky, the binder present may cause stuffing and linking problems which may be avoided by the addition of more water up to 10% by weight of the sausage emulsion. Size of the sausage grind is also important as better shrinkage control can be obtained with a smaller grind size (see FIG. 4). The following example is given to illustrate, but not to limit, the scope of the present invention.

EXAMPLE 1

Figure 1:
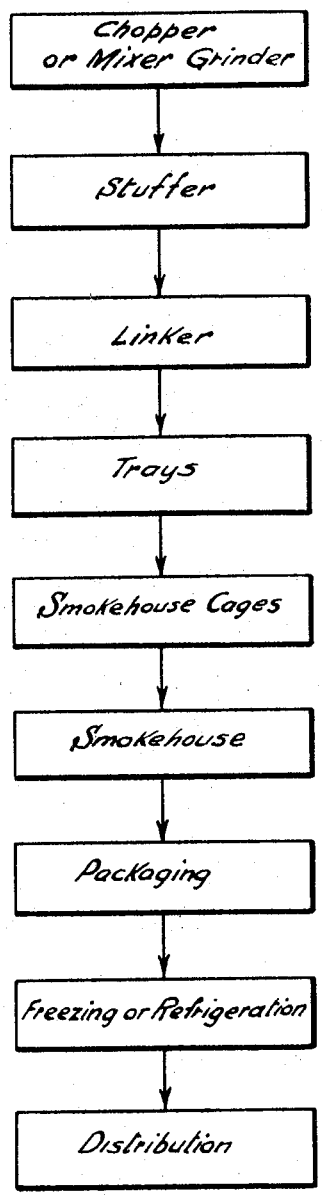
FIG. 1 is a flow sheet showing the different process steps in the manufacture of a precooked pork sausage.
Figure 6:
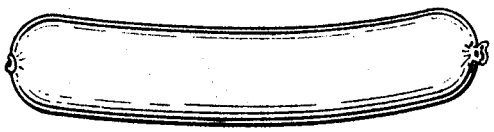
FIG. 6 illustrates the precooked sausage of the present invention.
Figure 5:
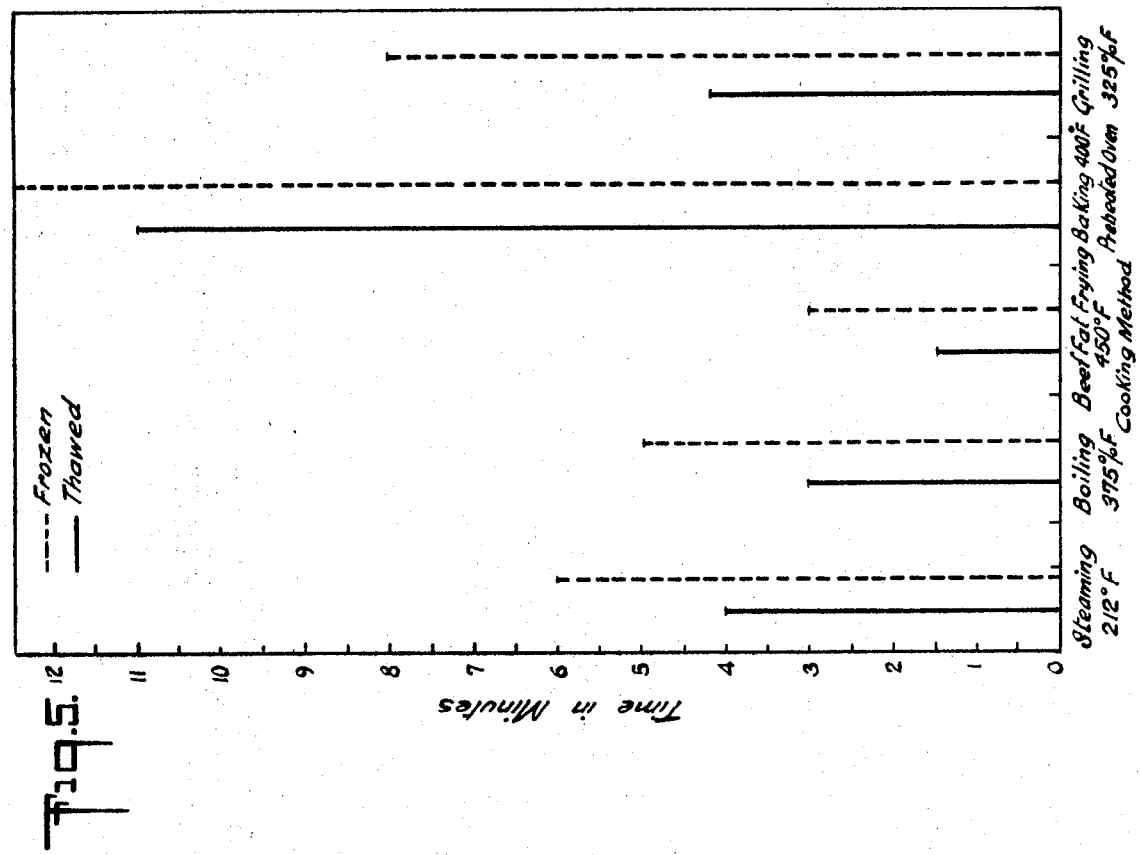
FIG. 5 is a graph which shows the cooking time required to prepare the precooked sausage for consumption.

Referring now to FIG. 1, 400 pounds of sausage meat having a lean to fat ratio of 65/35 is comminuted in a chopper for making fresh pork sausage equipped with a standard three-blade knife.

During the comminution step, the chopped meat is seasoned with the following spices:

Thyme—1.5 oz.
Mace—1.5 oz.
Ginger—1.5 oz.
Sage—8.0 oz
White pepper—11.0 oz.
Dextrose—1.5 lbs.
Salt—8.0 oz.

To the seasoned and chopped meat is added 7 pounds of wheat flour (1.75%) and 7 pounds of soya protein concentrate (1.75%) and the number of revolutions of the bowl is controlled to give effective mixing and incorporate the binder with the meat and fat. It is important to coat as much of the fat as possible with the binder during mixing to obtain shrinkage control.

The same requirements on temperature and condition of meat are necessary in the stuffing of precooked sausage and fresh sausage. Best conditions for preparation of fresh pork sausage are also best conditions for precooked product. Generally speaking, a meat temperature of 34–38° F. at stuffing and good fluid meat properties are best. Cold meat temperatures and poor flow properties that cause air pockets in the finished link, resulting poor precooked appearance. Also, warm meat and smear will result in poor precooked link appearance due to fat pockets.

The sausage emulsion after comminution is stuffed into extruded and shirred collagen casings of the type described and claimed in U.S. Patent No. 3,123,482. The diameter of the extruded collagen casing is 21 mm. and stuffing is performed in the same manner as is customary for producing fresh pork sausages. Care must be exercised to make sure the strands are filled tight to avoid air pockets in the finished links as the appearance of the finished product is directly related to how well the casings are stuffed.

Linking of the sausage is accomplished on a Famco JR 116 Linker, and each individual link is cut off. The machine is adjusted to produce sausages four inches in length.

The sausage links are collected from the FAMCO machine and loaded by hand on stainless-steel wire screen trays. The trays measure 36" x 42" and fit into a standard smoke tree cage. The links are arranged on the trays, side-by-side, to utilize as much of the available space as possible. Care must be exercised to avoid over-handling those links and having them touch side-by-side excessively when placed on the screen. If care is not taken in this respect, unnecessary fat pockets can occur in the finished links. While the link appearance is not extremely critical in as much as open ends and pigtails may be eliminated by shrinkage during the precooking process, best results are obtained on links with good appearance in the fresh state.

Precooking the sausage is accomplished in a modern smoke house equipped with steam, dry heat, and air-conditioning. It is essential that the smoke house be capable of coming up to called-for temperature as quickly as possible, i.e., within seven minutes. It is important in controlling the shrinkage that the internal link temperature be obtained as quickly as possible.

The linked sausages are precooked in the smoke house as follows:

First stage—Steam for three to five minutes with a wet bulb setting of 170° F. to an internal link temperature of 120–125° F. This results in a pull-back of the casing from the ends and plumps the sausage.

Second stage—Dry heat for thirty minutes at temperature increments of 10° F. starting at 140° F. and holding this temperature for ten minutes, increasing the temperature to 150° F. and holding this temperature for ten minutes, and finishing the precooking by heating for ten minutes at 160° F. The internal temperature should reach to 42° F.

Third stage—A cold water shower or quick chill to an internal link temperature of 70–90° F. The sausages may then be packaged directly or alternatively refrigerated to an internal link temperature of 42° F. prior to packaging.

The total process time is approximately 35 minutes not including the time to lower the internal link temperature to 42° F.

The precooked sausage so obtained are about 3.75 inches in length and may be recooked from the thawed state by grilling in three to five minutes. In the frozen state, the link can be cooked in eight to ten minutes. All methods of cooking produce good results. This includes grilling, baking, deep-fat frying, and broiling. Cooking problems, such as splitting and rupturing are relatively non-existent with precooked sausage when prepared as described above. Less total shrink is encountered with this product than fresh sausage.

The shelf life of a precooked sausage that has been processed as described above is excellent. Test results indicate that in the frozen condition, such sausages may be stored for ten to twelve weeks before rancidity and off-flavor. The shelf life if refrigerated at 40° F. is twelve to twenty-four days and will depend on the internal link temperature during processing. The higher the internal link temperature, the greater the shelf life; sausages which have been precooked to an internal link temperature of 160° F. have a shelf life of about twenty days.

What is claimed is:

1. A precooked, edible pork sausage, which has shrunk no more than 10% during the precooking process, comprising an extruded collagen tube, said collagen tube being filled with a pork emulsion which adheres to the interior surface of the tube, said emulsion being characterized by a lean to fat ratio of at least 60:40 and having intimately mixed throughout, no less than 2% and no more than 3½% of a binder selected from the group consisting of wheat flour, isolated soya protein, rusk, and mixtures thereof.

2. The precooked, edible sausage of claim 1 wherein the ratio of lean meat to fat is 65:35.

3. The precooked, edible sausage of claim 1 wherein the binder is 1.75% by weight of wheat flour and 1.75% by weight of isolated soya protein.

4. The precooked, edible sausage of claim 1 wherein the binder is 3½% by weight wheat flour.

5. A process for the manufacture of precooked, edible pork sausage, which has shrunk no more than 10% during the precooking process, which comprises:

comminuting a sausage formulation wherein the ratio of lean meat to fat is no less than 60:40 with from 2% to 3½% of a binder selected from the group consisting of wheat flour, isolated soya protein, rusk, and mixtures thereof, whereby the fat is coated with the binder by thorough mixing;

stuffing said emulsion into an extruded collagen casing, and linking the stuffed casing;

precooking the formed links in a smoke house by steaming for three to five minutes at a wet bulb temperature of 170° F. to an internal link temperature of 120–125° F.;

submitting the steamed sausages to a dry heat of 140° F. for ten minutes;

increasing the temperature to 150° F. for ten minutes, and then to 160° F. for an additional ten minutes until the internal temperature of the sausage reaches 148° F.; and chilling the sausage to an internal link temperature of 70–90° F.

6. The process according to claim 5 wherein the steamed sausage is submitted to dry heat for a total time sufficient to reach an internal link temperature of 150° F.

7. The process in accordance with claim 5 wherein the cooked sausages after reaching an internal temperature of 148° F. is quickly chilled to 42° F. internal link temperature by refrigeration.

8. A precooked, edible pork sausage comprising an extruded collagen tube, said collagen tube being filled with a pork emulsion which adheres to the interior surface of the tube, said emulsion being characterized by a lean to fat ratio of at least 60:40 and having intimately mixed throughout, 3½% by weight of rusk as a binder.

References Cited

UNITED STATES PATENTS

| | | | |
|---|---|---|---|
| 2,355,548 | 8/1944 | Musher | 99—109 |
| 2,973,277 | 2/1961 | Barnett et al. | 99—109X |
| 3,050,400 | 8/1962 | Poarch et al. | 99—109 |
| 3,100,710 | 8/1963 | Carlin | 99—109 |
| 3,123,482 | 3/1964 | Liberman | 99—109X |
| 3,216,827 | 11/1965 | Fetty | 99—109X |
| 3,275,452 | 9/1966 | Allen | 99—109 |
| 3,477,859 | 11/1969 | Brown et al. | 99—109X |

TIM R. MILES, Primary Examiner

PO-1050
(5/69)

UNITED STATES PATENT OFFICE
CERTIFICATE OF CORRECTION

Patent No. 3,589,915      Dated June 29, 1971

Inventor(s) David E. Lustig

It is certified that error appears in the above-identified patent and that said Letters Patent are hereby corrected as shown below:

In column 2, line 14, "control of shrinkage" should read --control of shrinking--.

In column 2, line 55, "Salt—8.0 oz." should read -- Salt—8.0 lbs.--.

In column 3, line 46-47, "The internal temperature should reach to 42°F." should read -- The internal temperature should reach at least 148°F. --.

Signed and sealed this 28th day of December 1971.

(SEAL)
Attest:

EDWARD M. FLETCHER, JR.
Attesting Officer

ROBERT GOTTSCHALK
Acting Commissioner of Patents